Nov. 30, 1965   W. H. W. SCHULLER   3,220,811
METHOD AND APPARATUS FOR THE MANUFACTURE OF A WEB OR MAT MADE
FROM GLASS FIBRE OR A SIMILAR SUBSTANCE
Filed Feb. 14, 1961   3 Sheets-Sheet 1
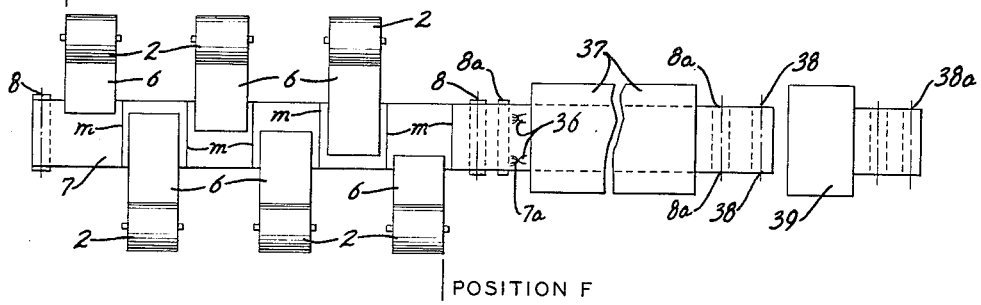
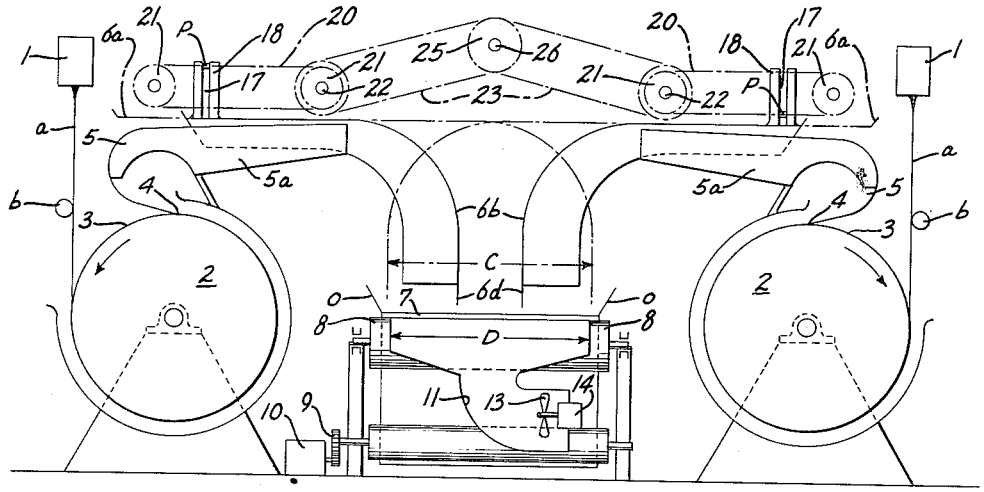
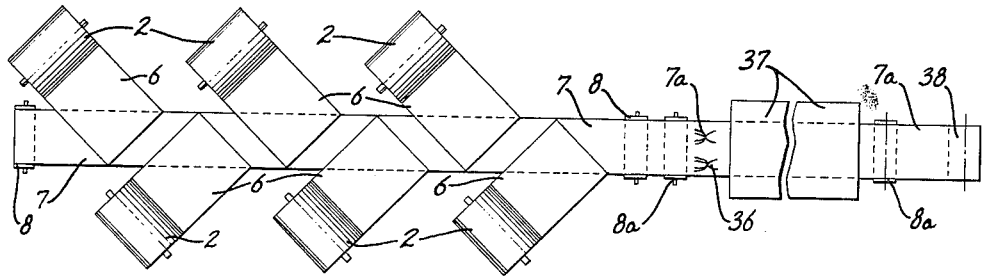
INVENTOR.
WERNER HUGO WILHELM SCHULLER
BY Morgan, Finnegan, Durham & Pine
ATTORNEYS

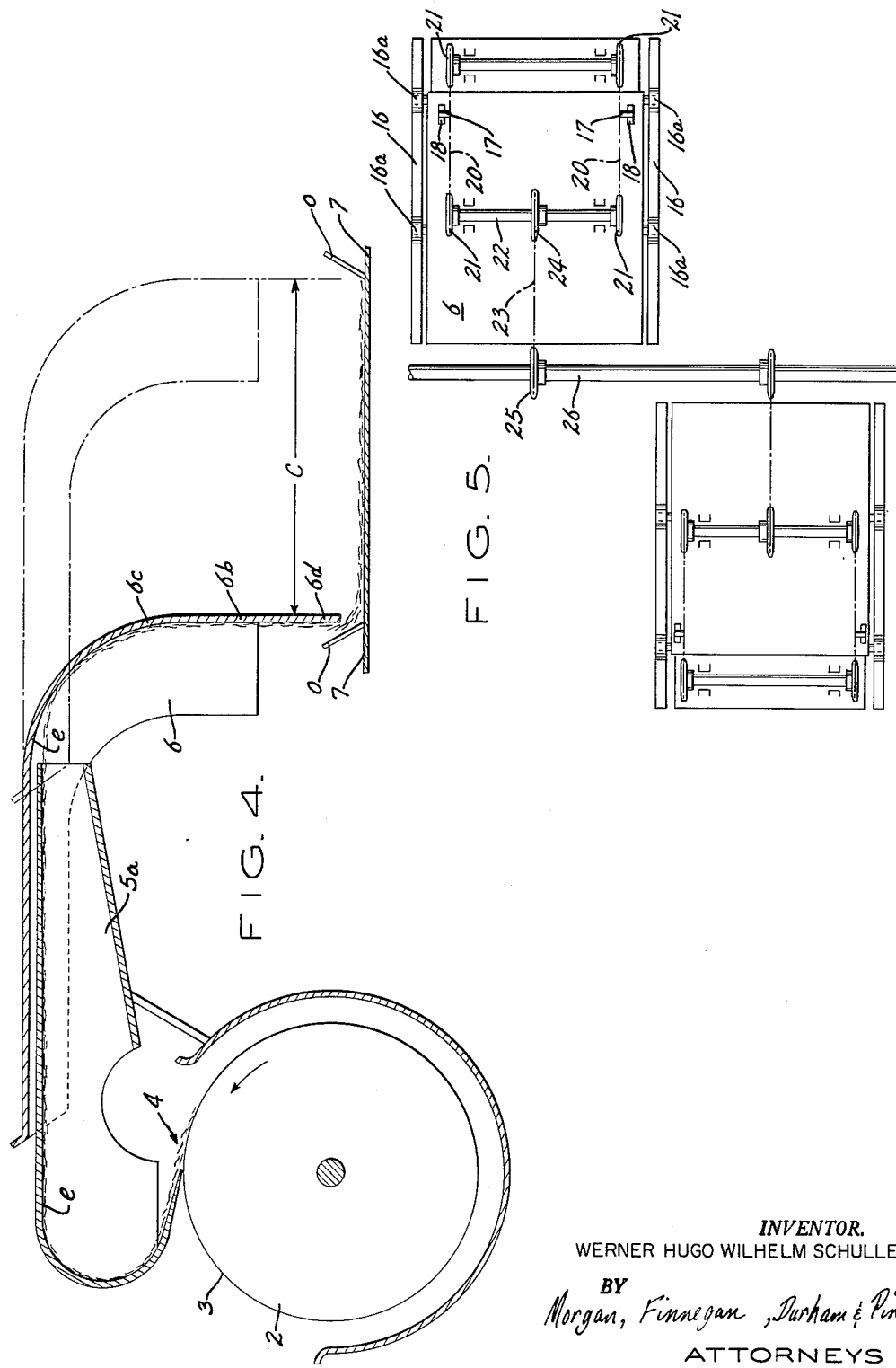

| LOCATION | AIR PRESSURE INCH W.G. | AIR VELOCITY FT./MIN. |
|---|---|---|
| I | .750" | 3500' |
| II | .300" | 2200' |
| III | .150" | 1500' |
| IV | .100" | 1300' |
| V | .075" | 1100' |
| VI | .062" | 1000' |
| VII | .075" | 1100' |

United States Patent Office 3,220,811
Patented Nov. 30, 1965

3,220,811
METHOD AND APPARATUS FOR THE MANUFACTURE OF A WEB OR MAT MADE FROM GLASS FIBRE OR A SIMILAR SUBSTANCE
Werner Hugo Wilhelm Schuller, Fort Saskatchewan, Alberta, Canada
Filed Feb. 14, 1961, Ser. No. 89,182
9 Claims. (Cl. 65—3)

The invention relates to the manufacture of a mat or web from glass fibre or the like, which may be subsequently treated in the manufacture of various products of which the web or mat forms the basis.

More particularly it relates to a mat formed of superposed, layered fibres and to mechanism for forming it.

This application is a continuation-in-part of my copending application Serial No. 502,311 filed April 19, 1955, and now Patent No. 2,996,102, for Manufacture of a Web or Mat Made From Glass Fibre or a Substance Having Similar Characteristics.

It is known to produce a web or tissue or glass fibre by various methods in which the fibres are bonded together by emulsions of synthetic resins or other thermoplastic materials. According to a known process, for example, a continuous filament is drawn off from molten or re-heated glass rod or marbles by means of a fast rotating drum, the filaments being then divided into fibres of varying staple lengths and finally deposited on a continuous belt to form a web or mat.

This process has the disadvantage in the production of a thin web or mat that a single fibre-producing unit only can be used, because the flow of production demands a fixed common axis of the drying oven and the fibre-producing unit, with the result that the rate of production is limited to the fibre output of one single fibre-producing unit. A further disadvantage is that if only a few filaments happen to break between the oven and the drum, a weak spot in the web or mat is bound to develop, due to uneven supply of fibre, and the process has continuously to be interrupted. Even thickness and evenness of fibre distribution are essential for ensuring the quality of the fibre mat of the finished article made from such mats.

In another known process, a plurality of marble fed ovens or bouchings are installed in a fixed position, relative to the conveyor belt and used in combination with high pressure air or steam to produce a mat on the moving belt. This process also has the disadvantage that even distribution of fibres over the whole width of the belt cannot be obtained because it is not possible effectively to control the fibre to flow evenly; such a mat cannot, therefore, be used for making web, mat or felt, where evenness of fibre distribution is required both in the crosswise and lengthwise directions.

It has also previously been proposed to form the fibres by blasting a fluid, such as steam or air against streams of molten glass so as to break up the streams into staple fibres and to project the fibres in a jumbled mass through a closed channel onto a conveyor belt, which moves across the open outlet end of the channel. This results in the production of a mat made up of a tangled mass of fibres, the thickness and/or density of which can be controlled only by controlling the blast of fibre-forming fluid, such as steam or air, and the speed of the belt on which the jumbled mass of fibres is deposited.

It has furthermore been previously proposed to apply the mass of fibres so formed onto a conveyor belt by a swinging or pivotal movement of distributing elements such as conveyor belts which deposit the mat, made up of the jumbled mass of fibres in overlapping relation on the belt.

It will be clear to those acquainted with the art, that it is impossible to produce in such a process a mat of uniform density and of a predetermined thickness, where only a control of thickness and/or density within wide limits is possible.

In all glass mats heretofore, the glass fibres have been unevenly distributed throughout the glass mat, resulting in weakness in the finished product.

The invention has among its objects to avoid these disadvantages and, in simple and continuous manner, to provide means which is not only relatively inexpensive but affords an evenness in fibre distribution in the mat or web hitherto never attained.

A further object of the invention is to provide a method of manufacture for such a mat or web in which the tensile strength of the mat or web in both longitudinal and transverse directions may be varied as desired.

The mat produced in accordance with the present invention includes comparatively long staple fibres, that is, fibres preferably eight inches in length or longer, up to twenty inches long. Heretofore, mats have been produced with the staple fibres of generally uniform length under five inches long.

Therefore, an added object of the invention is to provide a glass mat formed of superposed layered fibres of long staples.

According to the process of the invention for the continuous production of a web or mat of long glass fibres or of materials having similar physical characteristics such as mineral or plastic fibres, fibres in the form of staple fibres produced in any convenient manner are deposited on a continuously moving, air-pervious belt, the fibres being deposited on the belt by passing through one or more fibre-distributing heads which are reciprocated relative to the belt in such manner as to deliver and deposit the fibres evenly in a direction transverse to the length of the conveyor on the belt, the angle at which the fibres are deposited on the belt bearing a desired and predetermined relation to the direction of movement and/or speed of the belt. By reciprocating is understood a to and fro movement in a straight line. The fibre-producing units with the fibre-distributing heads are, according to the invention, mounted with their longitudinal axes lying transverse to the direction of the belt movement, either parallel to, or at an angle of between plus or minus 1° to 180° to the belt and drive means provided for imparting reciprocating movement to the distributing heads. The direction of movement of adjacent distributing heads at any one time is advantageously opposite.

By the process of the invention, using fibre-producing machines at, for example, ten or more fibre-producing positions, it is now possible to increase the production tenfold or more on a single belt, using one drying oven only. Furthermore, it is now possible, by depositing the fibres in a direction or directions transversely and at an inclination to the longitudinal axis of the belt, to ensure an even distribution of fibres over the whole width of the belt, and in such manner that the ratio of tensile strength in the longitudinal and transverse directions may be varied as desired. No additional reinforcement in either direction is needed in this way. Webs or mats of fine glass fibres of a superior quality may thus be produced cheaply, in a mass production method so that bonded mats, after impregnation with bitumen, asphalt, coal tar, resins or other plastic materials, are available wherever an even density of fibre in the mat is essential.

According to the invention furthermore, the angle at which the fibres are deposited on the conveyor belt may be varied by varying the relative reciprocating speed of the fibre-distributing heads across the belt and/or by varying the belt speed. In this way the tensile strength of the mat or web either in the longitudinal or in the transverse directions may be increased or decreased as desired within determined limits.

Such webs or mats produced in the manner described may be used, because of their considerably cheaper and simpler production method, to replace woven fabrics. Such a mat or web combines the characteristics of any desired strength ratio of fabric in the longitudinal and transverse directions and even density of the mat or web.

According to the invention furthermore, the fibres are guided in a curved path from the position of formation to the position of deposition on the conveyor belt being shielded against external forces by a member advantageously of channel section, which is so shaped and dimensioned as to cause the staple fibres to flow freely from the position of manufacture to the position of deposition of the fibres on the conveyor belt. The invention contemplates the employing of a novel distributing member of generally U-shaped cross-section. The staple fibres are travelled individually along the closed and tapered member to the open distributing member of inverted U or channel section and separately deposited in layers to form a mat of suitable thickness, such as 0.010″–0.050″.

The process according to the invention is diagrammatically illustrated by way of example in the accompanying drawings, in which:

FIGURE 1 illustrates a plan view of a complete group machine installation with an installation of six fibre-producing units for carrying out the process of the invention;

FIGURE 2 is a cross-section on an enlarged scale of a group machine, with the fibre-producing units disposed lengthwise and on both sides of a conveyor belt;

FIGURE 3 is a plan view showing a number of fibre-producing units disposed at an angle to the longitudinal axis of the conveyor belt;

FIGURE 4 is a cross-sectional view on an enlarged scale of the tapered channel guide member and the distributing head;

FIGURE 5 is a plan view of a section showing the drive for the reciprocating movement of two adjacent fibre-distributing heads adapted to move in opposite directions at the same moment;

Figure 6:
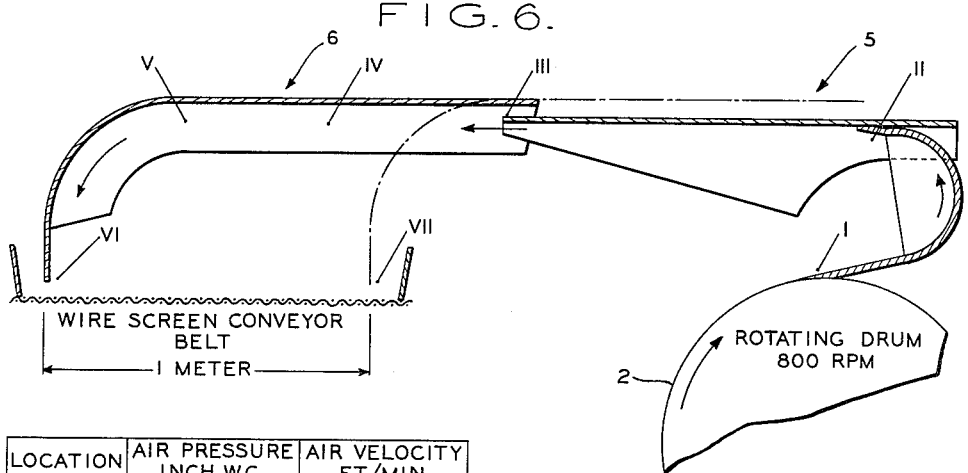
FIGURE 6 is a sectional side elevation of one of the distributing heads and guides illustrating the air pressure and velocity distribution therethrough.

Referring to FIGURE 2, the glass filaments $a$ are produced in any convenient known method advantageously according to the process described and claimed in British Patent No. 628,145, or are drawn from a fibre-producing position such as a furnace 1 (FIGURE 2) by means of a rotating drum 2. The filaments $a$, to which a sizing is applied at sizing pads $b$, are removed from the periphery 3 of the drum 2 by means of a scraper 4 by the aid of an air stream generated by the rotating drum. The fibres, broken into long staple fibres preferably between eight and twenty inches in length by the scraper 4, are guided through a curved guide member 5 to pass freely along a tapered guide member 5a. The curved guide member 5 is connected to the tapered member 5a and is of generally closed cross-sectional configuration, preferably rectangular, as shown in FIGURE 4.

Disposed in cooperating telescoping relationship with the end of member 5a remote from curved guide 5 is a distributing head 6 of generally U-shaped cross-sectional configuration.

The distributing head 6 is formed with a horizontal portion 6a and a vertical portion 6b joined by a curved intermediate portion 6c whereby the fibres are deposited from the extending part 6d of the vertical part 6b. Head 6 is preferably of inverted channel-shaped cross-section as shown in FIGURE 4. However, other open-channel configurations may be employed without adverse effect.

The long staple fibres shielded from external forces from their point of protection by guide members 5 and 5a and head 6 are air-carried or floated onto an endless conveyor belt 7 moving over rollers 8 and driven by belt drive or through gearing 9, as shown, by an electric motor 10 in FIGURE 2.

The belt 7 is air-pervious and consists preferably of wire mesh. Provided in a position directly below the upper part of the belt 7 is a suction box 1 which may be controlled by dampers provided at any number of positions along its length and is provided with a suction fan 13 driven from a motor 14.

The fibre-producing units are positioned on each side of the belt 7 with their distributing heads 6 immediately above and adjacent the belt 7, but separated by dividing metal sheets $m$ (FIGURE 1), and spaced from the side edges thereof. A number of fibre-producing units, for example six, as shown in FIGURE 1, may be provided to extend in lines on each side of the belt 7, the fibre-producing units on one side of the belt 7 being laterally staggered with respect to the corresponding units on the other side of the belt.

FIGURE 1 of the drawings shows distributing heads 6 at different positions of the stroke. The stroke may be varied if desired, provided only that the variation is effected in such manner as to ensure even distribution of the fibres over the whole width of the belt. Thus any fault in distribution that may occur with one head can be evened out, so as not to show the fault running continuously through the mat or web.

The fibre-producing means together with their distributing heads 6 may be disposed at an angle relative to the conveyor belt, which angle may be varied from plus or minus 0°–180° as, for example shown in FIGURE 3 where all the fibre-producing means with their distributing heads 6 are shown with their longitudinal axes at about an angle of 45° to the longitudinal axis of the belt 7. By varying the angle between the distributing heads and the longitudinal axis of the belt, the ratio of the strength of the web or mat in the longitudinal and transverse directions may be varied as desired within the limits imposed by the conditions of the disposition of the fibres in course of manufacture of the web or mat. Thus the ratio of tensile strength in the longitudinal and transverse directions may be varied within the limits of three quarters to one quarter each way. The variation in the angle may be effected by the pivotal mounting of the fibre-producing units and the fibre-distributing head together.

The distributing heads 6 are reciprocated in the direction transversely of the direction of the movement of the belt 7 by any suitable mechanism, such as disclosed in FIGURE 2, this movement may be effected by a chain and pulley drive, driven by a motor not shown. The heads 6, which are formed to an inverted channel section, are provided to move over rails 16 (FIGURE 5) on wheels 16a by means of two parallel guide members 18, fixed to the horizontal part 6a of the distributing head, which engage on each side of a pin $p$ secured to a chain 20, so that rotating the chain 20 a reciprocating movement is imparted to the heads 6 in horizontal direction. The chain 20 is mounted on two pulleys 21 one of which is mounted on a shaft 22, which is driven by a chain 24, mounted on two pulleys 23 and 25. The pulley 25 is mounted on a main drive shaft 26, which is driven by a motor (not shown).

Thus, as the distributing heads 6 disposed on opposite sides of the belt 7, are driven by the same shaft 26, synchronism of the distributing heads on opposite sides of the belt 7 is obtained.

A tapered guide member 5a, consisting of tapered 4-sided channel section open towards 5 and 6c, serves two purposes. First to ensure overlap between the inner end 6a of the head 6 and the upper curved end of the guide member 5. Second to delay the slowing down of the velocity of the air entrained staple fibres, coming from the guide member 5, and urging them into the open channeled distributing head 6 with sufficient force to reach the conveyor belt after the fibres have first travelled along the curved part 6a and the vertical part 6c of the distributing head 6, to be finally deposited from the extending part 6d of the vertical distributing head part 6b.

The width of the mat can be regulated by varying the stroke C of the transverse movement in combination with the width D of the suction box 11 and the edge forming panel O.

Preferably adjacent distributing heads 6 are geared to move in opposite directions in any one movement so that an even distribution of fibres takes place across the width of the belt 12.

After the deposition of the fibres evenly over the conveyor belt 7, the belt passes over rollers 8 as shown in FIGURE 1. The mat is passed to a second conveyor 7a on which the mat is treated with a binder as shown by spray nozzles 36 and passed into the drying oven 37 (FIGURE 1), where the mat is heated advantageously between a temperature of 100°–150° C. for a period of between one to three minutes, a lower temperature and a longer drying time giving a better quality product, because of less "migration" of the binder. The dry mat or web may then be directly wound on a roller 38 as illustrated in the construction of FIGURES 1 and 3 or may, after leaving the second conveyor 7a be passed through a separate curing chamber 39 where the sheet is subjected to a temperature of between 180°–220° C. for a period within the range of one to two minutes, and then wound on a roller 38a.

The cured sheet may then be processed by a further coating of any suitable material such as bitumen, tar or plastic, for use, for example, for roofing purposes, pipe wraps surfacing mat or battery separators.

In operation the filament formed in any suitable manner is drawn as by means of a drawing drum 2, sized at b and passed through guide members 5 by controlled air flow through guide 5a to a distributing head 6 which is driven to reciprocate transversely of the moving endless belt 7 and on which the fibres are evenly distributed to fall, gently assisted by the air stream, generated by the rotating drum 2, from the distributing head 6 while the distributing head 6 is performing in a continuous movement extending from one edge of the belt to the other. The fibres pass through the distributing head 6 which is formed as an open channel section which is so shaped and dimensioned that the air is controlled to cause a steady movement of the fibres along the base of the channel section, so as to be deposited gently, evenly and steadily on the moving belt.

Referring specifically to FIGURES 2 and 4, it will be noted that guide member 5a is closed while head 6, in telescoping relation therewith, is open at the side and bottom thereof. The air current in members 5, 5a and 6 generated by the rotation of drum 2 is directed by the curve of guide 5 and the tapered guide member 5a upwardly toward the upper portions of the head 6. Thus the glass fibres entrained in the air current are directed toward and flow along the upper open portion of head 6. These fibres are still moving adjacent the closed section as they are travelled around curved section 6c and down vertical section 6b for deposit individually on belt 7, from the extended portion 6d.

It will be understood that the fibers, individually entrained by the air current flowing in head 6, are still carried therealong in separate, spaced relationship but their path of travel is restricted toward the upper portion of the guide member 5a and the closed portion 6c and 6b of head 6. As the path of the fibres is at all instances close to the surface of the metal guiding the fibres, as at the curved portion 5, the tapered channel 5a and the curved and vertical portion 6c and 6d, respectively of distributing head 6, the fibres are deposited from 6d at the instantaneous position of 6 along its path C (see FIGURES 2 and 4). This ensures a distribution of the individual fibres as evenly as possible across the total width of the conveyor 7.

Further, the ratio of tensile strength in the longitudinal and transverse directions may be varied by varying the speeds of the belt 7 and of the drawing drum 2 and also by the selected angle of the distributing heads 6 to the longitudinal axis of the belt 7. Thus it will be understood that the flow of the fibres being controlled and only partially shielded by the U-shaped channels or heads 6 from the position of formation to the position of deposition on the belt 7 is maintained in staggered manner that an additional influence through climatization (plant air conditioning) is possible. This again promotes an even and controlled deposit of the staple fibres to form the mat.

It is most desirable that the glass fibres be dispersed as evenly as possible throughout the mat—about ¾ to 1½ pound of fibre per one hundred square feet of mat. The even distribution of the fibre provides the completed mat with the necessary tensile strength.

To produce a thin mat of for example 0.015–0.025 inch of acceptable strength, the long staple glass fibres forming the mat are individually floated through the tapered guide member 5a along channel sections 6 and intercepted by belt 7. The fibres are retained in flat intertwined disposition on belt 7 by the suction force generated by fan 13. The fibres from one head 6, though intermingled in their own group, are separately deposited in overlying layers with the fibres previously deposited on belt 7. The mat thus formed is composed of so many layers of superimposed long staple fibres as strokes of the fibre-distributing head 6 have been executed in the time the conveyor 7 has travelled from position E to position F (FIGURE 1). During and upon deposit, the fibres of each layer intermingle with those of the other layers to such an extent that the final product is of cmpletely uniform composition, showing no trace of the individual layers.

It will be understood that the lowermost fibres adjacent belt 7 are associated with head 6 at position E and the uppermost fibres with the last distributing head 6 at position F of FIGURE 1.

The flow of air through the system is controlled by use of the open channel section for head 6. This construction of head 6 effects expansion of the air flowing therethrough, and head 6 is so shaped and dimensioned that a steady controlled movement of gently flowing air and individual staple fibres issues from head 6 at 6d.

It was found in a typical construction embodying the present invention, shown in FIGURE 6, that to prodce a one-meter wide mat, drum 2 rotates at a normal speed of 800 r.p.m. The air pressure at the scraper, point I, was found to be about .750 inch on a water gauge while the air velocity at I was approximately 3,500 ft./min. At point II, at the bend in guide member 5, the air pressure was .300 inch while the air velocity was 2,200 ft./min. At point III, at the end of guide 5, the air pressure was .150 inch while the air velocity was 1,500 ft./min. At point IV, midway through head 6 in the extended position, the air pressure was .100 inch while the air velocity was 1,300 ft./min. At point V, at the bend in head 6, the air pressure was .075 inch while the air velocity was 1,100 ft./min. At the discharge end of head 6, point VI, the air pressure dropped to .062 inch while the air velocity decreased to 1,000 ft./min. With head 6 in the retracted position, the air pressure at the discharge end, point VII, was .075 inch while the air velociy was 1,100 ft./min.

These pressures and velocities were taken along the inner closed surface of guide 5 and head 6. It will be undestood that the slightly higher values at point VII as compared to point VI are due to the shortened travel of the air when head 6 is in its retracted position. However, it will be evident that the air pressure during its travel through guide 5 and head 6 drops at least .675 inch while the air velocity decreases by at least 2,400 ft./min. Thus, by utilizing the inverted U-shaped configuration for head 6, the air stream is expanded with the consequent pressure and velocity drop to effect gentle, controlled flow through head 6 and gentle deposit of the staple fibres onto the conveyor.

The invention in its broader aspects is not limited to the specific combination and improvements described, but departures may be made therefrom within the scope of the accompanying claims without departing from the principles of the invention and without sacrificing its chief advantages.

What I claim is:

1. The method of forming a mat of generally uniform density and thickness comprising the steps of: forming individual staple fibres from glass filaments, creating a plurality of air currents, entraining said fibres to float individually in each of said air currents, directing each of said air currents into an associated distributing member at an inclination towards the base thereof so as to delay the slowing down of each of said air currents, travelling said entrained fibres along and adjacent the inner periphery of the base of said distributing member to a deposit position, said distributing member having at least a portion thereof of channel-shaped cross section to decrease the pressure and velocity of said air current thereby gentling the flow of said air current, separately depositing said gently flowing, individually entrained fibres at a deposit station in layers of random superimposed fibres on a longitudinal travelling air pervious surface while continuously reciprocating each deposit position of said fibres transversely of the direction of said air pervious surface, thereby building up a mat of generally uniform density and thickness.

2. A method of manufacturing a mat from staple glass fibres or material having similar physical characteristics comprising the steps of; entraining said fibres to float individually in a current of air, directing said air current into an associated distributing member at an inclination towards the base thereof so as to delay the slowing down of said air current, traveling said entrained fibres along and adjacent the inner periphery of the base of said distributing member, said distributing member having at least a portion thereof of inverted U- or channel-shaped cross-section to decrease the pressure and velocity of said air current so as to gentle the flow thereof, directing said gentled current of air to a deposit station, and depositing said fibres separately in a random superimposed manner to build up a mat of generally uniform density and thickness.

3. The method according to claim 2 in which the distributing member includes a longitudinally curved element for depositing the fibres downwardly onto a horizontally disposed air pervious traveling collector and applying a suction force beneath said collector to facilitate deposit of fibres thereon.

4. The method according to claim 3 in which the deposit position of said fibres is continuously reciprocating across said collector.

5. Apparatus for manufacturing a mat of staple glass fibres comprising in combination means for manufacturing said glass fibres, means for entraining individual staple glass fibres in an air current, a guide for said air current and fibres, said guide extending from said fibre producing means to a fibre depositing station, said guide having at least a portion thereof adjacent said fibre depositing station of inverted U-shaped cross-section, means for directing said air currents into said guide for traveling said fibres along the inner, closed periphery of said guide, said guide shielding said fibres from random external air currents, and a traveling air pervious receiving member at said fibre deposit station for receiving individual fibres from said guide in individual superposed random relationship.

6. Apparatus for forming a mat of generally uniform density and thickness from staple glass fibres comprising in combination means for producing individual staple glass fibres, means for creating an air current, means for entraining individual staple glass fibres by said air current from said producing means, a guide for said air current and fibres, said guide extending from said fibre-producing means toward a fibre deposit station, a traveling receiving member at said deposit station, a distributing head formed as an extension of said guide on the portion thereof extending toward said fibre deposit station, said head being of generally inverted U-shaped cross-section, means for directing said air current to travel said fibres along the base of said head, said guide and head shielding said fibres from random external air currents, means mounting said head on said guide for reciprocating movement relative thereto with the free end of said head adjacent said receiving member, means for reciprocating said head to evenly deposit said individual fibres issuing therefrom across the width of said surface.

7. The apparatus as defined in claim 6 including means for directing said air current at an angle towards the base of said guide.

8. Apparatus for forming a mat of generally uniform density and thickness from staple glass fibres comprising means for producing individual glass fibres, means for creating a plurality of air currents, means for entraining individual staple glass fibres by each of said air currents, a traveling air pervious surface, a guide for each air current for channeling its associated air current and individual glass fibres toward said surface, a distributing element operatively associated with each guide for directing said air currents and staple glass fibres against said surface to simultaneously deposit individual fibres at a plurality of locations on said surface, each of said guides tapering toward its associated distributing element and of generally closed cross-section adjacent thereto, each of said distributing elements being of partially open cross-section, means for directing said air currents angularly towards the base of its associated guide and distributing element to travel the individual entrained fibres along the inner peripheries thereof, means movably mounting said distributing element for angular movement relative to the direction of travel of said surface, operating means for actuating said distributing elements in synchronism to travel the discharged portion of said elements relative to said surface in predetermined sequence to evenly distribute said staple glass fibres over the width of said surface to form a mat thereon.

9. The apparatus as defined in claim 8 including means for varying the angular relationship between said distributing elements and said traveling surface, and means for varying the speed of said surface, whereby the ratio of tensile strength of said formed mat in the longitudinal and transverse directions may be selectively controlled.

References Cited by the Examiner

UNITED STATES PATENTS

| | | | |
|---|---|---|---|
| 2,172,153 | 9/1939 | McClure | 154—28 |
| 2,518,744 | 9/1950 | Barnard | 154—28 XR |
| 2,732,885 | 1/1956 | Van Der Hoven | 156—371 XR |
| 2,996,102 | 8/1961 | Schuller | 154—101 XR |

EARL M. BERGERT, *Primary Examiner.*

CARL F. KRAFFT, *Examiner.*